L. S. TAYLOR.
GRASS AND WEED CUTTER.
APPLICATION FILED MAR. 3, 1917.
1,248,751.
Patented Dec. 4, 1917.
2 SHEETS—SHEET 2.
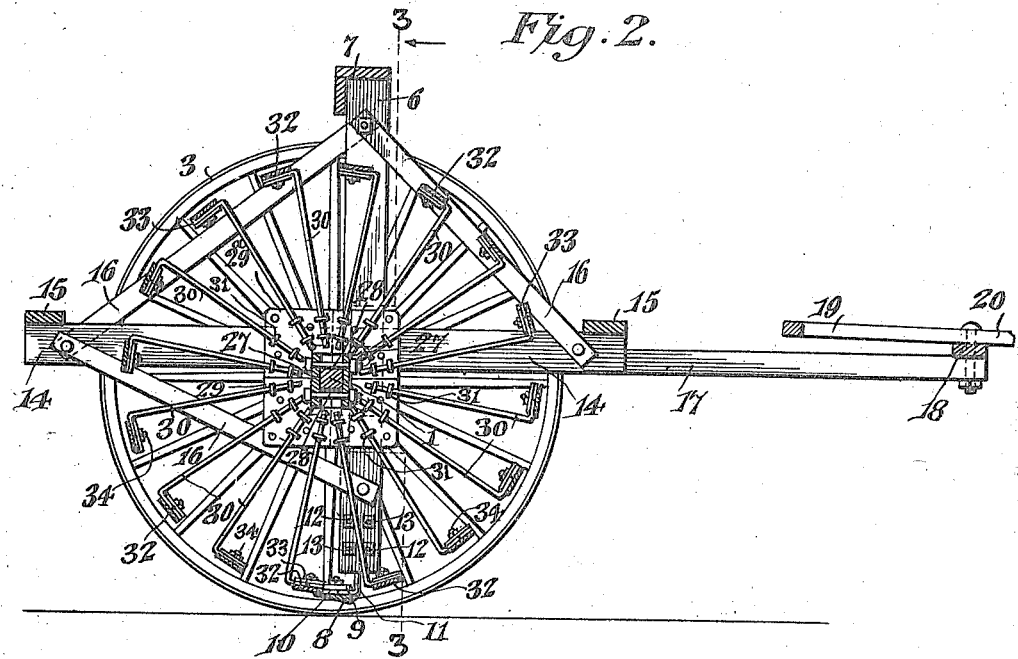
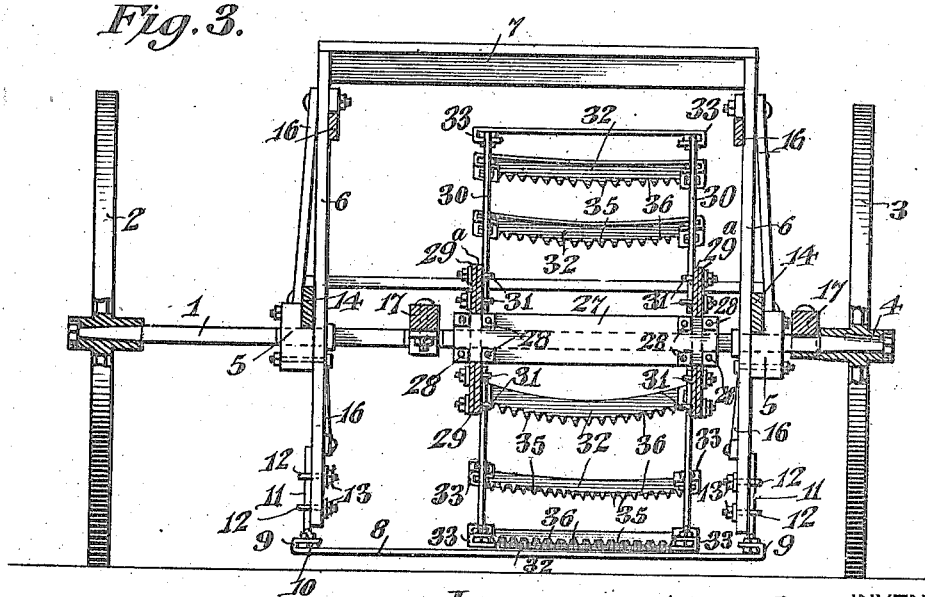
WITNESSES
Jas. K. McCathran
F. T. Chapman
Lawrence S. Taylor, INVENTOR
BY
ATTORNEY

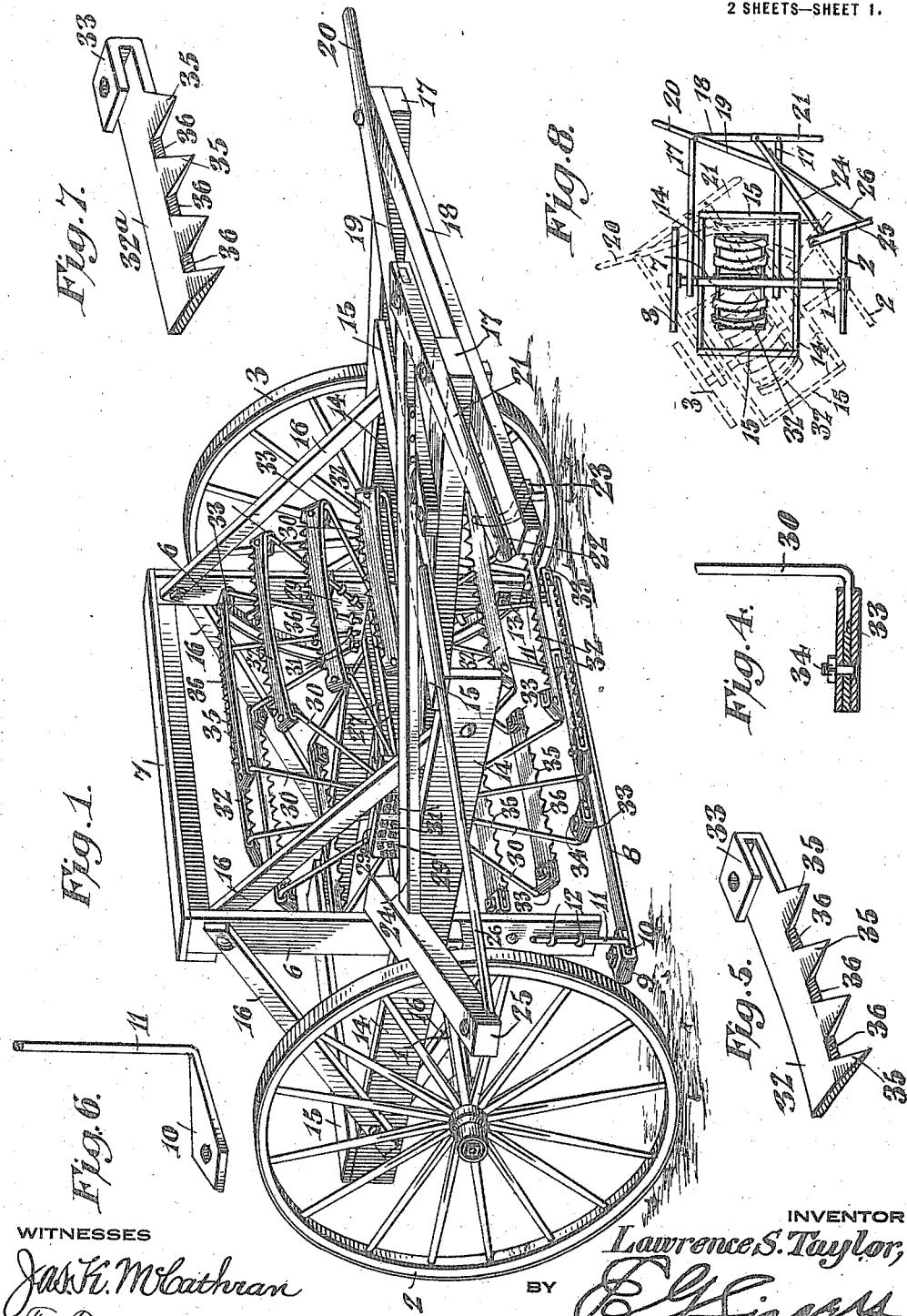

UNITED STATES PATENT OFFICE.

LAWRENCE S. TAYLOR, OF NACOGDOCHES, TEXAS.

GRASS AND WEED CUTTER.

1,248,751.  Specification of Letters Patent.  Patented Dec. 4, 1917.

Application filed March 3, 1917. Serial No. 152,232.

*To all whom it may concern:*

Be it known that I, LAWRENCE S. TAYLOR, a citizen of the United States, residing at Nacogdoches, in the county of Nacogdoches and State of Texas, have invented a new and useful Grass and Weed Cutter, of which the following is a specification.

This invention has reference to grass and weed cutters and its object is to provide a structure whereby weeds may be destroyed either by cutting the weeds off above a lower growth of grass, or, when conditions favor, pulling the weeds, both stalk and root, from the ground. The cutter, however, is designed principally for cutting grass.

In accordance with the present invention a rotary cutter is provided which may be manipulated to make a sweeping or scythe cut, and which may also be operated so as to automatically clear itself of grass or other material clogging the blades of the rotary cutter.

The invention comprises a wheeled structure having a rotary cutter thereon fast to one of the wheels, and the other wheel, the structure being a two-wheeled vehicle, having means for holding it stationary at will, so that the vehicle may be moved about the stationary wheel as a pivot to cause the rotary cutter and the wheel driving it to move in a curved path similar to the movement of a scythe. Associated with the rotary cutter is a stationary cutter carried by a frame in operative relation to the rotary cutter. The frame is provided with handles so that the vehicle may be propelled by hand with the holding means for the second-named wheel carried by the frame within convenient reach of the operator.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1 is a perspective view of a cutting apparatus embodying the invention.

Fig. 2 is a longitudinal vertical section taken about intermediate of the width of the rotary cutter.

Fig. 3 is a cross-section on the line 3—3 of Fig. 2 but showing the supporting wheels in elevation, with the hubs of the wheels in section.

Fig. 4 is a detail section showing the manner of supporting one end of a blade of the rotary cutter.

Fig. 5 is a perspective view of one end of one of the cutter blades.

Fig. 6 is a perspective view of an end support for the stationary cutter blade.

Fig. 7 is a perspective view similar to Fig. 5 but showing a somewhat different form of blade.

Fig. 8 is a diagram illustrating the operation of the structure.

Referring to the drawings there is shown an axle 1 having wheels 2, 3, respectively, mounted on opposite ends thereof, the wheel 2 being free to turn on the axle and the wheel 3 being secured thereto by a key 4, or in any other suitable manner, so that the axle 1 will turn with the wheel 3, but not with the wheel 2.

Mounted on the axle by means of journal boxes 5 is a frame composed of uprights 6 and a top connecting member 7, the frame being substantially rectangular, although such shape is not obligatory, while the bottom member of the frame is omitted, being replaced by a stationary cutter blade 8 which may be similar to stationary cutter blades as employed on an ordinary scythe cradle. A convenient mode of mounting the blade 8 is to form the blade with return ends 9 each embracing a broadened end 10 of a bar 11, the end 10 being bent at about right angles to the bar 11. Adjustment of the blade 8 in an up and down direction is brought about by the use of U-bolts 12 clamping the bars 11 to the uprights 6, the bolts being held in place by nuts 13.

Fast to the upright frame is another frame made up of longitudinal side bars 14 and cross bars 15 with braces 16 connecting the two frames rigidly together.

Mounted on the axle 1 are bars 17 extended toward what constitutes the rear of the machine in operation and beyond the corresponding end of the side bars 14. At the rear ends the bars 17 are connected together by a strip 18 and also by another strip 19 having an extended end 20 to constitute a handle. Mounted on that bar 17 which is the closer to the wheel 2 is a lever 21 having the end opposite to the handle 20 formed into a handle portion 22, while the bar 18 may extend beyond the strip 17 carrying the lever 21 to an extent to permit the application of a stop member 23 limiting the sweep of the lever 21 in one direction. Connected to that end of the lever 21 remote from the handle 22 is a bar 24 carrying a brake member 25 in operative relation to the wheel 2, the brake member being suitably braced by a brace rod 26.

On opposite sides of the axle 1 between the bars 17 and within the frame made up of the strips 6 and 7, is a hub composed of two plates 27 secured by bolts 28. The hub made up of the plates 27 has heads 29 at the ends, these heads being conveniently formed of strips 29ᵃ of wood placed in crossing relation to prevent warping. Of course, if the heads and hub be made of metal throughout, a different construction may be followed.

Secured to each head 29 and radiating therefrom are bars 30 which may correspond in structure to the bars 11, being held to the heads by U-bolts 31 similar to the U bolts 12, so that the length of projection of the bars 30 with respect to the heads 29 may be adjusted as needed. Each head 29 carries a circular series of the radial bars 30 which may be similar in form to the bar 11 with its extension 10, as shown in Fig. 6. The bars 30 carry the ends of cutter blades 32 having return ends 33 similar to the return ends 9 of the bar 8, and bolts 34 secure the cutter bars 32 to the radial bars 30 the same as the bolts 9 secure the bar 8 to the bars 11.

Each blade 32 has teeth 35 projecting from one edge, these teeth tapering to a relatively sharp point, and are spaced apart lengthwise of the blade or cutter bar 32, while the latter has the edge from which the teeth project beveled, as shown at 36, to a cutting edge to coact with the cutting edge of the bar 8. Each cutter bar 32 bows forwardly, this having been found to be advantageous. The cutter bars may, however, be made straight with the lower bar correspondingly shaped. A portion of such a cutter bar is indicated at 32ᵃ in Fig. 7, the other parts of the bar 32ᵃ being the same as similar parts of the bar 32.

The rotary cutter made up of the bars or blades 32 or 32ᵃ and carried by the bars 30, which constitute spokes, is of drum shape. When the cutter is operated the stationary cutter bar or blade 8 and the blades of the rotary cutter may be so adjusted as to sever weeds or the like above an undergrowth of grass, while the latter is not affected, but the tops of the weeds are destroyed, so that after a few cuttings the weeds may be killed out.

When the ground is sufficiently soft, as after a rain, the weeds are gripped and pulled up both stalk and root by the cutter machine and then the reverse movement automatically removes the weeds from the blades.

The cutter may be pushed forwardly in a straight line, on releasing the brake wheel, to a new position for a scythe movement. The action on weeds or upon tall grass is made by gripping the wheel 2 by the brake shoe 25, which may be done by grasping the handle 22 of the lever 21, and thereby holding the wheel 2 from turning and a movement in a curved path is imparted to that side of the machine having the wheel 3, the latter being the propelling wheel for the rotary cutter. The result of this is that the machine is given a forward curved movement similar to the action of a scythe, wherefore the movement may be termed a scythe movement. This is indicated in Fig. 8. Then the machine is returned toward its first position so far as the wheel 3 is concerned, and may be pushed forwardly so far as the wheel 2 is concerned, the latter having in the meantime been automatically released from the brake by the forward movement. Then on the next cutting movement the wheel 2 is gripped by the brake and the wheel 3 once more propelled. These movements cause a discharge of grass or weeds which may have been caught in the rotary cutter or between the rotary and stationary cutters by the forward and reverse movements.

In order to facilitate the scythe movement the rotary cutter is placed considerably nearer to the wheel 3 than it is to the wheel 2 in order that there may be a pronounced sweep in a curved path of the rotary cutter about the pivot point represented by the wheel 2 when held against rotation.

In order to obtain the best lever power the cutter blades should occupy about one-third of the width of the machine and be located on the side of the machine remote from the wheel engaged by the brake, such wheel therefore becoming a fulcrum wheel. This reduces the tendency of the fulcrum wheel to slip on the ground and thereby prevent the proper scythe movement.

What is claimed is:—

1. A grass and weed cutter, comprising a two-wheeled structure with the wheels on opposite sides, rotatable cutting means wholly carried by the wheels and connected to and actuated by one of the wheels, manipulating means for propelling the cutter, and holding means for the wheel other than that connected to the cutting means and mounted on the manipulating means for holding the second-named wheel against rotation, whereby the cutting means may be propelled bodily in a curved path about the second-named wheel as a pivot support when said second-named wheel is held against rotation.

2. A grass and weed cutter, comprising a vehicle having two wheels and an axle, a rotary cutter mounted on the axle and connected to one of the wheels for actuation thereby, the other wheel being free to rotate without actuating the cutter, a fixed cutter in the path of the cutting means of the rotary cutter, manipulating means for the vehicle carried by the axle, and brake means on the manipulating means for holding the second-named wheel against rotation at will for the propulsion of the vehicle in a curved path about the held wheel as a pivot.

3. A grass and weed cutter, comprising a two-wheeled vehicle with the wheels on opposite sides, rotary cutting means carried directly by the wheels and directly connected to one of the wheels for actuation thereby, said cutter being nearer to the wheel to which it is connected than to the other wheel, manipulating means for propelling the wheels and cutting means, and brake mechanism on the manipulating means in operative relation to the second-named wheel to hold the latter against rotation at will, whereby the vehicle may be moved in a curved path about the second-named wheel as a pivot, with the rotary cutter propelled by the first-named wheel.

4. A grass and weed cutter comprising a two-wheeled vehicle with an axle connecting the wheels, with one wheel fixed to the axle and the other mounted to rotate freely thereon, a rotary cutter also fixed to the axle nearer to the first-named wheel than to the second-named wheel, a frame mounted on the axle, a stationary cutter carried by the frame in operative relation to the first-named cutter, handle means on the frame for the propulsion of the vehicle, and a brake and manipulating means carried by the handle means in operative relation to the second-named wheel, whereby the second-named wheel may be held against rotation at will to serve as a pivot about which the vehicle may be turned to actuate the rotary cutter and move both cutters over the ground in a curved path.

5. A grass and weed cutter, comprising a vehicle with a rotary cutter comprising cutting blades and carriers therefor, and a stationary cutter in operative relation to the rotary cutter and comprising blades and carriers therefor, the carriers of both the rotary cutter and the stationary cutter being adjustable in the direction of their lengths to vary the distance of the cutters from the surface over which the vehicle travels without varying the axis of rotation of the rotary cutter.

6. A grass and weed cutter, comprising a rotary cutting member provided with a circular series of cutting blades each mounted on supporting arms or spokes adjustable radially with respect to the axis of rotation, and a stationary cutter in operative relation to the rotary series of cutters, said stationary cutter being mounted upon rods also adjustable radially with respect to the axis of rotation of the rotary cutter, whereby the diameter of the rotary cutter may be varied and the stationary cutter may be kept in operative relation to the rotary cutter blades to vary the distance of the cutters from the surface over which they travel without varying the distance of the axis of rotation of the rotary cutter from said surface.

In testimony, that I claim the foregoing as my own, I have hereto affixed my signature in the presence of two witnesses.

LAWRENCE S. TAYLOR.

Witnesses:
  W. T. ORTON,
  PHILIP SANDERS.

Copies of this patent may be obtained for five cents each, by addressing the "Commissioner of Patents, Washington, D. C."